# 3,573,924
Patented Apr. 6, 1971

3,573,924
METHOD OF PELLETING ANIMAL FEED IN-
GREDIENTS CONTAINING HYDROPHILIC
MATERIALS
Albert I. Zarow, Mount Pulaski, Ill., assignor to Kane-
molass Laboratories, Inc., Mount Pulaski, Ill.
No Drawing. Filed May 31, 1967, Ser. No. 642,354
Int. Cl. A23k 1/02
U.S. Cl. 99—6                                   7 Claims

ABSTRACT OF THE DISCLOSURE

A method for pelleting particulate animal feed compositions containing molasses and other hygroscopic ingredients which comprises using dehydrated molasses as the source of carbohydrate in the composition and preheating the composition to a predetermined temperature prior to the introduction of live steam for lubrication to control precisely the moisture content of the pelleted material and increase the efficiency of the pelleting process.

BACKGROUND OF THE INVENTION

It is common in the art of preparing animal feed supplements to incorporate sources of carbohydrate, protein and other nutritional ingredients, with or without a bulk carrier or a meal feed ingredient, into compositions which can be formed into pellets for ease in handling, proportioning and dispensing. Cane molasses is a highly desirable material in these compositions as an inexpensive source of carbohydrate, as a taste masking agent for urea or other protein sources, and as a binding agent, containing as it does 3–55% by weight of sucrose and a trace to 25% of reducing sugars, all as invert sugar, 6–10% of ash, about 20% organic non-sugars and about 25–30% of water. A typical cane (black strap) molasses, for example, contains a minimum of 48% total sugar, as invert sugar. Beet molasses contains as much as 50% by weight of sucrose, but only traces of reducing sugars and equivalent amounts of ash, organic non-sugars and about 30 to 35% of water. Citrus, corn and wood molasses are similarly constituted, but also contain less sugar and about 30% to 35% of water.

The presence of water in the various types of molasses used to prepare the supplements or basic animal feeds with the supplements as a part thereof, interferes with the formation of pellets therefrom and also deleteriously affects the properties of the finished product. It is well known in this art and understandable considering the syrupy nature of these mother liquors from sucrose manufacture, that water, both from the molasses and other sources, causes both the supplement mixtures and the feed meal mixtures prepared therewith to be sticky, to have a tendency to ball and not to flow well from bins to the pelleting machines. Although the incorporation of wet molasses does reduce fines and dust in the preparation and handling of feed pellets, the pellets themselves are soft and wet and tend to crumble. More serious is the fact that the sticky character of these compositions greatly increases the work load on the pelleting machines, causes difficulty in movement of the feed mixtures through the pelleting dies and the finished particulate product is soft and wet, tending to crumble and agglomerate in handling and storage. These difficulties increase the cost of production and detract from the utility of the product, particularly in those products wherein water sensitive and heat sensitive ingredients such as urea are incorporated.

The prior art has eliminated many difficulties in this technology, but offered only partial solutions to some of these problems. In one method, described in U.S. Pat. 2,707,151, the molasses is mixed with a filler and the mixture is dehydrated by pressure extrusion in repeated cycles until the water content is reduced to the desired level by evaporation due to the heat of working. U.S. Pat. 2,947,632 teaches the introduction of steam into the material to be pelleted to act as a lubricant as the material passes through the pelleting die. This process requires pre-drying of the mixture to be pelleted and the introduction of sufficient steam in the pelleting machine to form a layer of condensed water on the surfaces of the particles of the mixture passing to the pelleting die. Increased pelleting rates are disclosed due to the fact of lubrication and the addition of large quantities of live steam in the pelleting operation which rapidly raises the temperature of the feed to properly plasticize and condition it for extrusion. Temperatures of 140 to 190° F. are attained in the feed entering the pelletizing machines or coming from the extruders of these processes.

Obviously, pressure extrusion and the conventional live steam methods do not apply to feed compositions or supplements containing hygroscopic, water soluble and temperature sensitive ingredients such as urea, minerals and milk products which have become necessary ingredients in animal feeds. Urea and milk products are not only extremely soluble in water at 100° F. or more, but tend to decompose or carmelize at about 140° F. Furthermore, in accordance with this invention, an excess of water from any source during the pelleting of feeds containing water-soluble or temperature sensitive ingredients has been found to greatly reduce the production rate due to the material becoming sticky, causing excess friction or increased consumption of horse-power and plugging of the pellet mill dies, and the final pellets are softer, causing caking in storage bins or packages. Even the use of a vegetable fat or animal fat as a lubricant for these nutrient-containing feeds has not solved the problem of excessive moisture in the usual pelleting processes.

SUMMARY OF THE INVENTION

In the process of pelleting feed mixtures which include hygroscopic ingredients, I have discovered that when dehydrated molasses is used as a carbohydrate source, and the moisture content of the total material entering the pelleting die is accurately controlled by preheating the mixture prior to the introduction of live steam for lubrication, so that the moisture content of the final product is about 15% by weight, the output of the pelleting operation is unexpectedly increased and the final product is devoid of the undesirable properties hereinbefore mentioned. The increase in production rate with no increase in power consumption is unexpected in view of the prior art teaching that large quantities of live steam are necessary as a lubricant and plasticizer. Actually, it has been found that the solubility of urea, wet molasses, milk products, minerals and the like, being enhanced by increases in the temperature of the water present and induced by excessive live steam, lowers production rates, produces softer pellets, induces pellet agglomeration and pellet solidification in packaged or stacked form. Although the process of this invention is directed primarily to the use of dehydrated molasses and accurate control of temperature rise from the introduction of live steam, the process allows the use of some wet molasses in the product provided the temperature attained by preheating is at least about 100° F.

Accordingly, the primary objects of this invention are to provide an improved process for the production of pelleted animal feed compositions containing water-soluble ingredients; to provide an improved process for the preparation of pelleted or particulate animal feed compositions containing molasses; to provide an improved pelleted form of animal feed composition containing molasses; and to provide an improved process for the preparation of pelleted or particulate animal feed compositions containing molasses as a carbohydrate source and hygroscopic protein materials.

Another object of this invention is to provide a process for the preparation of pelleted or particulate animal feed composition containing molasses and substances having an affinity for water, which process includes a preheating step wherein the compositions are first heated to a temperature of about 110° F. to 130° F. and then raising the temperature of the material to about 150° F. by the introduction of dry live steam just prior to pelleting or formation into discrete particles, wherein the power consumption is reduced, the material flow rate is increased, and the final product is free-flowing, sufficiently bodied for easy handling and is readily packaged, stored and dispensed.

DESCRIPTION OF THE PREFERRED EMBODIMENT

In order to demonstrate the invention, the following examples are given:

Example I

A conventional process comprises preparing, in a batch mixer and for each ton of finished feed, a composition including 500 pounds of wet cane molasses and 440 pounds of urea which has about 64% by weight of protein. This mixture was conveyed to a soft pellet mill and processed by injection of steam immediately prior to pelleting. It was found that because of the water solubility of the urea and also its hygroscopic nature, the finished feed pellets were impossible to handle and impossible to package or bulk because the pellets stuck together and solidified to a mass.

Example II

A dehydrated cane molasses supplement, characterized by being a pellet binder, an anti-caking agent, a lubricant, and a source of carbohydrate, containing on a dried basis about 55% by weight of cane molasses and about 43% by weight of selected corn cob fractions, was modified by adding about 2% hydrogenated vegetable fat to the dehydrated molasses-cob fractions mixture. This supplement product was found to be capable of absorbing about 2.2 to 3 pounds of water per pound of product during the pelleting and formed a firm pellet. When mixed in substantially equal proportions with urea or a urea-containing feed, the product was found to preferentially absorb moisture and allow the urea or urea-containing material to remain free flowing. Upon absorbing moisture the molasses product remains soft instead of hard and the product becomes plasticized when subjected to heat at a temperature of about 100° F. to 150° F. In this plasticized form it is readily pelleted.

This supplement product was added to a feed material containing urea at the rate of 25% or 500 pounds of the supplement per ton of finished feed mixture, the feed mixture containing 440 pounds or 22% by weight of urea per ton. The feed material employed was the product of Purdue University, known as "Purdue 64," a ruminant animal feed containing 64% protein maily from urea. Using dry steam introduced into the feed material just prior to pelleting, it was found that a pellet production rate of about 3½ tons per hour could be maintained on a 75 H.P. mill and the pellets were hard and smooth and easily flowed out of the bulk bin. No attempt was made to increase the output of the pellet mill and a single die size, 3/16 inch by 2 inches, was used.

Example III

The process of Example II was repeated with the addition of about 20 to 40 pounds (1 to 2% by weight) of animal or vegetable fat per ton of feed material in order to lubricate the pellet mill dies. This reduced the amount of steam necessary for the process, minimized the amount of water introduced and allowed the molasses-cob supplement to absorb moisture from all sources and produce an acceptable product. Again no attempts were made to increase the output or change the die size.

Example IV

In order to investigate the effect of heat alone on the plasticizing properties of the supplement composition of Example II, an experiment was conducted by heating the supplement-feed mixture externally in a heat exchanger prior to pelleting. To this end the mixture of Example II including 40 pounds of fat per ton of feed was fed at its ambient temperature of 60° F. to a laboratory pellet mill die having a ¼ inch by 1½ inch die aperture. One half of the mixture was pelleted at the 60° F. temperature at full electrical load, during which time a pellet temperature of 150° was observed. The 90° F. rise in temperature was caused by the heat of friction as the feed passed through the die. The pellets were satisfactory.

The other half of this feed mixture was preheated to 120° F. using indirect heat from a heat exchanger, and fed to the same laboratory pellet die machine. It was found that the electrical load was reduced by 50% and the pellet temperature reached equilibrium at 155° F. Thus a temperature rise of only 35° F. in the pelleting mill was experienced, the feed rate to the pellet mill was increased between 40 and 60% without change in the pellet temperature. A better lubricating and more plastic mixture was formed by the indirect heat, resulting in increased production harder pellets, and no agglomeration, as opposed to unheated feed or feed at 60° F.

Example V

In another experiment two conventional pelleting feed compositions were prepared. Composition A, a cattle supplement containing 192 pounds of urea per ton of feed to be pelleted on a ¼ inch by 1½ inch die at the rate of 4¼ to 5 tons per hour, driven by a 125 H.P. motor. The other feed, Composition B, a dairy supplement containing 92 pounds of urea per ton of feed to be pelleted at a rate of 5 tons per hour using a 3/16 inch by 2 inch die on a 125 H.P. motor. Both of these feed products were subjected to preheating in the heat exchanger at about 120° F. prior to pelleting. It was found that even with indirect heat the pelleting operation was difficult, the pelleted feeds stuck in the bin and they were difficult to remove from the storage bins. The production rates were poor by comparative standards for both Composition A and B.

Subsequently, 200 pounds of a feed supplement comprising 55% dehydrated cane molasses, 43% corn cob fractions, and 2% hydrogenated vegetable fat, were added to Composition A which was then preheated to 120° F. and forced through a 3/16 inch by 2 inch die. It was expected that the use of a smaller diameter die with a longer length would reduce the production rate from 4½ to 5 tons per hour to about 4 tons per hour, as had been the previous experience in pelleting. Quite unexpectedly, the production rate of the mixture of Composition A plus the feed supplement was 9 tons per hour. The resultant pellets were hard and flowed from the bin like shelled corn.

Then, 100 pounds of the foregoing feed supplement were added to Composition B and thoroughly mixed therewith. The production rate, using the ¼" by 1½" die was found to exceed 9½ tons per hour with this feed mixture. The mill would have taken a greater production flow, but the feeders could not be made to run faster without changes in gear ratio, etc. This mill produced more and better pellets with less electrical load when working with the mixture of Composition B plus the feed supplement. The heat exchangers were used at 120° F. as in the case of Composition A.

The foregoing experiments establish that the use of indirect heat alone without the incorporation of the pellet binder, anticaking, lubricant and molasses-containing feed supplement of this invention, is not effective in producing acceptable pellets of a urea-containing animal feed. The use of the feed supplement of this invention with indirect heating prior to pelleting, minimizes the amount of auxiliary steam for the purpose of lubrication and pelletizing during pelleting and produces smoother, harder, easier handled pellet products having the desired consistency, density and flow characteristics and at greater production rates with decreased power requirements.

An essential factor in the improved pelleting process, however, is the accurate control of the moisture content of the material being pelleted, not only to facilitate the pelleting operation, but also to provide a finished product that will have the desired characteristics. I have found that a moisture content of about 15% by weight in the material being forced through the pelleting die is the maximum for good results in both the finished product and efficiency of the pelleting process.

The optimum temperature for the material entering the die is about 150° F. in order that the mixture of ingredients will be sufficiently plastic for pelleting. The starting temperature of the material, however, is about 60° F. which leaves a needed temperature rise of about 90° F. to reach optimum conditions. Conventionally, this temperature increase is brought about by the introduction of live steam (high pressure and dry) into the material being pelleted, both as a plasticizer and lubricant, as the the material is being propelled toward the die.

It is a fact, however that for each 20° F. of temperature rise caused by the live steam the feed material mixture will absorb 1% by weight of additional moisture. Generally, the mixture to be pelleted will enter the pelleting mill with a moisture content of about 12%. Of course, this will depend upon the ingredients used and as a general rule I find that an addition of about 2 to 3% to the inherent moisture content of the mixture is ideal for good results. In the conventional process, however, wherein a temperature rise of about 90° F. is needed, the live steam introduced for heating and lubrication will add some 4.5% of moisture to the mixture being pelleted and, assuming a starting moisture content of at least 12%, the net result is that the mixture will contain 16.5% by weight of moisture and be very soft, gummy and difficult to process and handle.

With my improved process the step of preheating the material mixture, as by means of a heat exchanger applied to the pelleting machine at its material receiving end, the moisture content of the finished product can be precisely controlled by regulating the temperature of the heat exchanger and hence the mixture when it reaches the point of introduction of the live steam. Thus by raising the mixture temperature from 60° F. to 130° F., before the live steam is introduced to raise the mixture to 150° F., the temperature rise from the steam is only 20° F. and the added moisture is only 1% for a total mixture content of 13% (12 plus 1). Similarly, if a moisture increase of 2% is desired, the preheating step is limited to 110° F., leaving a 40° F. rise to be effected by the moisture adding live steam.

The feed supplement comprising a mixture of dehydrated molasses and corn cob fractions in substantially equal proportions and with or without about 1% to 5% by weight of a lubricant, which can be animal fat, vegetable fat and their hydrogenated products and mixtures thereof, can be used in any amount sufficient to provide the desired carbohydrate content of the finished feed. In general, in using the molasses-cob fraction supplement of this invention the amount used is proportioned to the amount of urea or other water sensitive ingredient in the animal feed or to be incorporated in the animal feed. For this purpose the ratio of the feed supplement to the amount of water sensitive ingredient can be about 1:1 to 1:2 or higher. As long as this ratio does not go above 1:3 the results of this invention will be obtained because of the high water absorption capacity of the molasses-cob fractions material.

Ratios below 1:1 can be used but are unnecessary unless a more dilute product in respect to protein, mineral or milk fat values is contemplated. An average feed composition will contain about 25% by weight of the dehydrated molasses-cob fractions supplement and about 20 to 25% urea and excellent pellets will result from my new process. However, successful results have been had where the material pelleted was as much as 50% urea. In any event the moisture content of the entire mix when introduced to the pelleting machine, will determine the extent of preheating before live steam is applied.

The animal fat or vegetable fat levels can be maintained at about 10 to 20 pounds/ton of animal feed, to eliminate any bin flow problems to the pellet mill, and although the presence of this ingredient is not critical to the end results or objectives of this invention, it is preferred that the fact be added to the molasses-cob fractions feed supplement. Examples of animal fats are beef tallow, lard oil, and whale blubber while examples of vegetable fats are coconut oil, babassu oil, palm kernal oil, palm oil, olive oil, castor oil, corn oil, peanut oil, rape seed oil, same being esters of higher fatty acids (lipoids) i.e. the glycerides. The inclusion of the animal or vegetable fat depends somewhat on the type of main animal feed meal used and preferably the fat should be hydrogenized.

The improved pelleting process is adaptable to substantially any animal feed meal. Included are soybean meal, cottonseed meal, mill by-products, grain screenings, alfalfa meal, corn gluten feed, ground barley, malt sprouts, linseed meal, "Sweet Soy 12," sunflower seed meal, sesame seed meal, ground corn, pulverized oats, and mixtures thereof.

The urea, the chief nitrogenous product of protein metabolism, used in the feed compositions of this invention and which is peculiarly adapted to respond to the preheating step of this invention is preferably a water soluble urea of animal feed or fertilizer grade.

The dehydrated molasses can be prepared from any mother liquor from which natural sugars have been crystalized including cane, beet, citrus, corn and wood molasses containing unrecovered sucrose, reducing sugars, organic non-sugars and ash. This would include so-called "first molasses," "second molasses," blackstrap molasses, refiner's syrup, barrel syrup, Steffen molasses and lactose molasses, the latter being obtained in the preparation of milk sugar.

The water content of the mother liquor is reduced by the application of heat with steps being taken to avoid decomposition and charring as are known in the art. Heat in the form of direct fire, electrical or steam coils can be used in a wide variety of heating vessels or concentrators including means to remove the water vapors as formed and also including the application of a vacuum. The rate of water removal is a function of time and temperature controlled to avoid carmelization or loss of the inherent properties of the ingredients. The removal of water is continued until the dehydrated product contains from 1% to 4% by weight of water. Other known prior art methods of dehydration can be applied such as heating by extrusion.

The corn cob fractions are obtained by grinding corn cobs into fine aggregate form and separating the outer hard kernel receptacles or "butterfly wings" from the inner white pith and wood-like portion of the cob, which constitutes the special or selected corn cob fractions used in the process of this invention.

From this description it is apparent that this invention provides a pelletable animal feed composition comprising an animal feed meal, about 5% to 70% by weight of hygroscopic water soluble materials and at least about 20% by weight of a mixture of dehydrated molasses and corn cob fractions with or without an animal or vegetable fat.

It is also apparent that this invention provides a process for the formation of stable, particulate animal feed compositions containing ingredients which have an affinity for water, wherein preheating and the controlled addition of water prior to mechanical treatment overcomes or mitigates any tendency to agglomerate, crumble, cake, or otherwise disintegrate or cause difficulty in the handling both before mechanical treatment and after mechanical treatment and also in the end use. By affinity for water is meant water solubility, and materials which are hygroscopic, capable of absorbing water from the atmosphere, or which are desiccants or are generally described as hydrophilic. The absorbed water may be water of hydration or loosely bound water and generally causes the materials to liquify or become sticky. Mechanical treatment includes extrusion, molding, granulation compaction and related processes wherein discrete individual particles are formed regardless of the particle dimensions or uniformity. The invention has particular application in the formation of uniform pellets by extrusion and molding.

The preheating step is conducted under anhydrous conditions, that is, without the addition of water and without the removal of water, and may be done by any suitable means such as steam heated or electrically heated devices. The time between preheating and mechanical treatment should be such as to permit the introduction of sufficient dry steam to gain the desired temperature peak and generally, the temperature of mechanical treatment will be about 20 to 40° F. higher than the preheating temperature. Since mechanical treatment imparts some heat to the composition, through die friction, adjustment of the preheating range is indicated.

The main advantages derived from the use of my improved pelleting process and dehydrated molasses-corn fractions material are to be found in the production of high quality pelleted feed compositions having a high molasses and urea content of which will keep well over extended periods of storage, packed or in bulk, with minimum shrinkage of moisture content and a hard, dry, free flowing and non-sticking character; and in the greatly increased production efficiency that can be imparted to the conventional pelleting mills with but minor operational changes.

Although the process and compositions of this invention have been demonstrated by specific examples, these are not to be construed as limiting and are only set forth in detail for the purpose of illustrating embodiments of this invention, and it is to be understood that the details of the procedure or the ingredients used may be varied widely by those skilled in the art without departing from the spirit or scope of the invention.

I claim:
1. The process of producing particulate animal feed compositions in the form of pellets containing hydrophilic ingredients which comprises the steps of mixing at ambient temperature substantially dehydrated molasses with an animal feed composition containing urea and said hydrophilic ingredients, preheating the mixture to a temperature of at least about 100° F. without the addition of moisture, then heating the mixture to a temperature of about 150° F. by the introduction of live steam into the mixture to provide a moisture content of about 15% by weight of the mixture, and then pressing the resultant material to form pellets thereof which are hard, dry, free flowing and nonsticky.

2. The process in accordance with claim 1 in which said preheating is conducted at a temperature of about 100° to 130° F. and said preheated mixture is then subjected to the addition of dry steam to increase its moisture content.

3. The process in accordance with claim 1 in which said dehydrated molasses is mixed with said feed meal as a supplement composition comprising about 50% by weight of light density corn cob fractions capable of absorbing approximately 4 pounds of water per pound of cob fractions.

4. The process in accordance with claim 1 in which said preheating is conducted to heat the mixture to a temperature of about 100 to 130° F. and said preheated mixture is then subjected to the introduction of dry steam sufficient only to increase its temperature to about 150° F. before entering the pelleting die.

5. The process in accordance with claim 1 in which said dehydrated molasses is introduced into said feed meal, prior to the preheating thereof, as a supplement composition comprising:
about 55% by weight of cane molasses,
about 43% by weight of corn cob fractions, and
about 2% by weight of hydrogenated vegetable fat.

6. The process according to claim 1 wherein the preheating is done to raise the temperature of the composition to about 100° F. to 150° F. and then sufficient dry steam is introduced into the composition to increase its moisture content, before pelleting, by about 1 to 3% by weight.

7. A pelletable animal feed composition containing hydrophilic nutrient ingredients and a supplement comprising:
about 55% by weight of cane molasses, and
about 45% by weight of corn cob fractions;
the amount of said supplement being from one to three times that of said hydrophilic nutrient ingredients and said feed composition containing about 20% to 50% by weight of water soluble urea and being characterized by becoming plastic and readily pelletable at a temperature of about 150° F.

References Cited

UNITED STATES PATENTS

| | | | |
|---|---|---|---|
| Re. 24,261 | 12/1956 | Martin | 99—6 |
| 2,801,174 | 7/1957 | Vincenty | 99—6 |
| 2,806,788 | 9/1957 | Leker | 99—2 |
| 2,808,332 | 10/1957 | Anderson et al. | 99—6 |
| 2,912,331 | 11/1959 | Turner et al. | 99—6 |
| 2,947,632 | 8/1960 | Kruse | 99—6 |
| 3,014,800 | 12/1961 | Guidarelli | 99—2 |
| 3,246,336 | 4/1966 | Baribo et al. | 99—6 |
| 3,416,928 | 12/1968 | Freese | 99—2 |

FOREIGN PATENTS

| | | | |
|---|---|---|---|
| 553,139 | 2/1958 | Canada | 99—6 |
| 945,705 | 1/1964 | Great Britain | 99—6 |

NORMAN YUDKOFF, Primary Examiner

F. E. DRUMMOND, Assistant Examiner

U.S. Cl. X.R.

99—2, 199